ns Patent [19]

United States Patent [19]

Thomas

[11] 4,075,032
[45] Feb. 21, 1978

[54] ANTIMONY OXIDE PIGMENT AND PROCESS OF MANUFACTURE

[75] Inventor: David Charles Thomas, Oklahoma City, Okla.

[73] Assignee: Kerr-McGee Chemical Corporation, Oklahoma City, Okla.

[21] Appl. No.: 788,158

[22] Filed: Apr. 18, 1977

[51] Int. Cl.$^2$ ............................................. C09C 1/00
[52] U.S. Cl. ................................. 106/303; 106/308 B
[58] Field of Search ............................ 106/303, 308 B

[56] References Cited

U.S. PATENT DOCUMENTS

| | | | |
|---|---|---|---|
| 2,882,178 | 4/1959 | Dunn, Jr. et al. | 106/303 |
| 3,545,994 | 12/1970 | Lott, Jr. et al. | 106/303 |
| 4,022,636 | 5/1977 | Murray | 106/308 B |

Primary Examiner—Winston A. Douglas
Assistant Examiner—J. V. Howard
Attorney, Agent, or Firm—William G. Addison

[57] ABSTRACT

The present invention provides a process for the surface treatment of antimony oxide for use as a pigment in paints or plastics wherein a hydrous oxide or mixture of oxides is precipitated onto the antimony oxide pigment. Specifically, this invention concerns the precipitation of hydrous oxides of titania, alumina or silica. In operation, the pH of an aqueous slurry of antimony oxide is adjusted to be within a specified pH range and the coating of the antimony oxide is effected by adding an amount of the hydrous oxide to cause precipitation of the hydrous oxide upon the antimony oxide pigment. The present invention contemplates an improved antimony oxide pigment having a first coating of amorphous alumina and a second coating of boehmite alumina. The present invention also contemplates an improved antimony oxide pigment having a first coating of titania and a second coating of alumina.

28 Claims, No Drawings

ANTIMONY OXIDE PIGMENT AND PROCESS OF MANUFACTURE

BACKGROUND OF THE INVENTION

1. Field of the Invention

The present invention relates to a process for the surface treatment of antimony oxide pigments. 2. Description of the Prior Art Antimony oxide has long been known for its value as a flame retardant and anti-oxidant additive for paints and plastics. However, the use of antimony oxide has several disadvantages. Variations in particle size and purity have been found to produce undesirable fluctuations in opacity from batch to batch and while the relatively high index of refraction of antimony oxide may not be detrimental in the preparation of flame retardant paints, it has often proved inappropriate for those applications where it is desired to produce a substantially transparent plastic material. Moreover, the tendency for antimony oxide to impart opacity as well as different degrees of tinting strength to plastic materials is especially undesirable when colors are to be used in the plastic. Thus, surface treatment of the antimony oxide is desirable to overcome these disadvantages.

Efforts to overcome these disadvantages include the use of phosphorus compounds and while these have been effective in producing relatively translucent plastics, the phosphates are not only expensive but may have deleterious effects on the stability of the plastic. In general, the prior art processes have each possessed the disadvantage of relatively high temperature operations to effect calcining, for example, and in other treatments. In U.S. Pat. No. 3,740,245 issued to White et al., a flame retardant additive for plastics is prepared by reacting antimony oxide with a substrate comprising hydrous silica, hydrous alkali or alkaline earth metal silicate in a weight ratio in the range of from 1:4 to 1:1 on an antimony oxide to substrate basis. The reaction is carried out by calcining an admixture of said compounds at a temperature within the range of from 400° to 550° C in an oxygen containing atmosphere.

U.S. Pat. No. 3,560,441 issued to Schwarcz discloses another means for insuring improved translucency and uniform color in plastics wherein antimony oxide is mixed with a compound of boron and fused to form a boron-glass by heating the admixture to a temperature of from about 650° to 1100° C for a period of time sufficient to melt the admixture followed by rapid cooling and grinding to a preferred particle size. However, this process also has the disadvantages attending a relatively high temperature operation requisite to the formation of a glass melt followed by quenching to produce a glass frit and subsequent grinding to provide a prescribed particle size.

As previously mentioned, antimony oxide has been used as a flame retardant in paints and U.S. Pat. No. 2,882,178 issued to Dunn et al., discloses an improvement wherein the antimony oxide is coated on a substrate of particulate silica. While this material compares favorably with antimony oxide as a flame retardant additive, the antimony coated silica is relatively abrasive and hence causes excessive wear of processing equipment attended by the inclusion of metallic contaminants in the final produce thus causing marked graying in the end product.

SUMMARY OF THE INVENTION

It has now been found, quite unexpectedly, that by treating antimony oxide by the surface treatment processes disclosed herein a marked improvement in its dispersibility and other pigmentary properties is noted.

The present invention comprises application of the following processing steps:

(a) Wet milling to disperse the crystal aggregates and to grind the antimony oxide crystal aggregates to a smaller size;

(b) Chemical surface treatment to maintain the degree of deaggregation developed in the wet milling step and to make the antimony oxide surface more chemically acceptable to the resins in which it is dispersed; and (c) Dry grinding to disperse agglomerates of the chemically treated antimony oxide formed during drying. At this point, other chemical additives could be used to further improve on the micronization process.

In accordance with the present invention, chemical surface treatment is accomplished by providing an aqueous slurry of antimony oxide to which alumina or other hydrous oxides, such as silica or titania, alone or in admixture, is added to form a precipitate on the surface of the antimony oxide pigment. The precipitated coating of alumina or other oxide is formed on the pigment by adjusting the pH of the slurry to a level within a specified pH and then adding sufficient alumina or other hydrous oxide to produce the coating.

It has been found that the structure of the alumina coating on the antimony oxide pigment varies with the pH range in which the hydrous oxide is precipitated. Alumina precipitated in an acidic range is of an amorphous form while alumina precipitated in a basic pH range is of a crystalline form or, more specifically, of a beohmite form. The boehmite form of alumina coating provides the desired characteristics or pigmentary properties for the antimony oxide pigment while the amorphous form of alumina coating improves the handling characteristics associated with the manufacturing processes involved in producing the pigment.

Further, it has been found that antimony oxide coated with from about 0.5 percent to about 3.0 percent alumina possesses superior handling properties when approximately half of the alumina coating is precipitated from an acidic medium (providing an amorphous alumina) and the remaining portion of the alumina coating is precipitated in a basic pH range (producing beohimite alumina). Thus, the present invention also contemplates an improved process for adding or applying multiple layers of alumina in a single process treatment.

DESCRIPTION OF THE PREFERRED EMBODIMENT

In accordance with one aspect of the present invention antimony oxide is wet milled to disperse the crystal aggregate and grind the crystals to a smaller size in, for example, a sandmill, vibro-energy mill or ball or pebble mill. Thereafter, an aqueous slurry of antimony oxide is prepared and heated to a temperature in the range of from about 40° to about 100° C. A first coating of alumina is formed on the pigment by adjusting the pH of the slurry to a level within a first pH range, the pH range being from about 1 to 3.5 with a preferred pH range of from about 2.5 to about 3.0 and then adding a sufficient amount of basic aluminum salt, such as sodium aluminate or other alumina coating agent, to provide a first coating of alumina and to adjust the pH to a level within a range of from about 8.0 to about 9.0. Following the formation of the first coating, a second coating of alumina is precipitated onto the pigment by adding additional basic aluminum salt while maintaining the pH of the slurry within a second pH range, the second pH range preferably being at the level of from about 8.0 to about 9.0.

After the final addition of aluminum salt, the pigment may be digested if desired. In one particular process, digestion is accomplished by subjecting the slurry to a temperature within a range of from about 40° to about 100° C for approximately 15 minutes after which the slurry is neutralized, filtered, washed and dried.

Thereafter, the dried alumina coated antimony oxide pigment is subjected to dry grinding to disperse the agglomerates of the chemically treated antimony oxide formed during the drying process. Such dry grinding methods may include micronization, hammer-milling (micropulverization) or dry ball milling, for example.

In accordance with another aspect of the present invention, an aqueous slurry of antimony oxide is prepared as previously described and again heated to a temperature in the range of from about 40° to about 100° C and the pH is adjusted to a level within a range of from about 9.0 to about 10.0, if adjustment is necessary. A first coating of titania is formed by the addition of from about 0.5 to 1.5 percent titania from a water soluble source of acid soluble titania, for example as from a 30 percent solution of $TiCl_4$ in water or $TiOSO_4$ or other titania coating agent, until the pH of the slurry is less than about 3.0. A preferred coating is formed by the addition of from about 0.5 to 1.0 percent titania to the antimony oxide slurry.

Thereafter, the slurry is adjusted to a second pH range, the pH range being from about 7.0 to about 12.0 with a preferred pH range of from about 7.5 to about 8.5, while sufficient aluminum salt is added to the slurry to precipitate an additional alumina coating of from 0.5 to about 3.0 percent alumina upon the titania coated antimony oxide pigment, with a preferred alumina coating of from about 1.0 to 1.8 percent.

After the final addition of aluminum salt, the pigment may be digested if desired, as previously indicated, and then is neutralized, filtered, washed and dried prior to dry grinding.

The specific processes hereinbefore described may be more fully illustrated by the following examples and the results of the treated antimony oxide pigment performance tests in Table I.

EXAMPLE I

Antimony oxide ($Sb_2O_3$) was mixed into deionized water while the pH was maintained at 10.0 with the addition of sodium hydroxide until the desired solids level was obtained of about 50 percent solids. The mixture then was sandmilled in a 6-bar batch sandmill at 1400 fpm peripheral speed with 20–30 mesh Ottawa sand.

The milled slurry was thereafter subjected to the following chemical surface treatment. The slurry containing 750 grams $Sb_2O_3$ heated to 70° C and the pH was adjusted to between 2.5 and 3.0 with concentrated sulfuric acid. A first portion of alumina from a solution of sodium aluminate sufficient to form a 1 percent alumina coating by weight of $Sb_2O_3$ was added to the slurry and the pH was adjusted by adding concentrated sulfuric acid to keep the pH between 8.0 and 9.0 after which the remainder of the alumina was added to the slurry. The slurry was allowed to digest for 15 minutes at 70° C and the slurry was neutralized by slowly adjusting the pH to a level of about 6.0 with concentrated sulfuric acid over 10 to 15 minutes. The neutralized slurry then was filtered, washed and dried at 110° C over night for micronization and performance testing. Micronization was at 120/120 psi air plus 0.15 percent of an organic micronizing aid at feed rates of 60 and 120 grams per minute.

EXAMPLE II

Antimony oxide was prepared as in Example I and subjected to the following chemical treatment. The slurry containing 750 grams $Sb_2O_3$ was heated to a temperature of 70° C and sufficient titania was added to form a 0.6 percent titania by weight of $Sb_2O_3$ coating from a 30 percent solution of $TiCl_4$ in water. The slurry then was adjusted to a pH level of 8.0 via the addition of a 20 percent solution of sodium hydroxide and sufficient alumina from a solution of sodium aluminate was added to form a 1.8 percent alumina coating by weight of $Sb_2O_3$. The slurry was allowed to digest for 30 minutes at 70° C and then was neutralized by slowly adjusting the pH to a level of about 6.2 with concentrated sulfuric acid over 10 to 15 minutes. The neutralized slurry then was filtered, washed, dried and micronized as in Example I.

After preparation of the surface treated antimony oxide pigment of Examples I and II, samples of the pigments as well as untreated antimony oxide was formulated with a standard acrylic paint and tested by gloss measurements on both 1 mil and 3 mil drawdowns. The drawdowns were on sealed paper cards read over white.

The contrast ratio, a measure of hiding power or opacity calculated by reading reflectance from a film over black and over white was also determined using the same cards. The reading over black is divided by the reading over white to obtain a fraction of obscuration. A high reading implies a high hiding power.

A final test was conducted upon the pigment samples through the formulation of a 1 percent pigment polyethylene resin (Union Carbide DYNH-1) and extrusion to make a tape of the resin material from which torque measurements were obtained. A lower value represents a lower torque required to extrude the film and in a sense, this provides a measurement of dispersion efficiency of the pigment.

TABLE I

| SAMPLE Antimony Oxide Pigment | Test Results On Antimony Oxide Pigment | | | | | | |
|---|---|---|---|---|---|---|---|
| | Gloss Measurement | | Contrast Ratio | | Polyethylene Resin Extrusion Test Torque, m/gms | | |
| | 1 mil | 3 mil | 1 mil | 3 mil | Max. | Min. | Avg. |
| Untreated | 25/02 | 35/05 | .125 | .3315 | 2975 | 2300 | 2750 |
| Treated - EXAMPLE I | | | | | | | |
| 60 gm/min. micronization | 76/32 | 81/45 | .3025 | .6321 | 2800 | 2225 | 2500 |
| 120 gm/min. micronization | 78/28 | 80/40 | .3230 | .6205 | 2700 | 2200 | 2425 |
| Treated - EXAMPLE II | | | | | | | |

TABLE I-continued

Test Results On Antimony Oxide Pigment

| SAMPLE<br>Antimony Oxide Pigment | Gloss Measurement | | Contrast Ratio | | Polyethylene Resin Extrusion Test Torque, m/gms | | |
|---|---|---|---|---|---|---|---|
| | 1 mil | 3 mil | 1 mil | 3 mil | Max. | Min. | Avg. |
| 60 gm/min. micronization | 76/32 | 81/45 | .3052 | .6321 | 2625 | 2150 | 2350 |
| 120 gm/min. micronization | 74/28 | 80/40 | .3230 | .6205 | 2600 | 2225 | 2375 |

Clearly, these test results indicate the improved performance in both gloss development and opacity of the pigments produced by the processes disclosed herein over the untreated antimony oxide pigment. Further, the polyethylene resin extrusion test indicates in each case that the average torque required to extrude the surface treated pigments was lower than that of the untreated pigment, thus indicating that less energy would be required to extrude a film with the improved pigments over the untreated pigments.

While the methods herein disclosed form preferred embodiments of this invention, this invention is not limited to those specific methods and changes may be made in the processes or in the steps of the processes or in the sequence of the steps of the processes of the present invention without departing from the spirit and scope of the invention as defined in the following claims.

What is claimed is:

1. A coated antimony oxide pigment comprising:
   an antimony oxide pigment;
   a first coating comprising at least one member selected from the group of titania, predominately amorphous alumina or silica, on the antimony oxide pigment; and
   a second coating comprising at least one member selected from the group of alumina, predominately boehmite alumina, or silica on the antimony oxide pigment over the first coating.

2. A coated antimony oxide pigment comprising:
   an antimony oxide pigment;
   a first coating of predominately amorphous alumina on the antimony oxide pigment; and
   a second coating of predominately boehmite alumina on the antimony oxide pigment over the first coating.

3. A process comprising:
   providing an aqueous slurry of antimony oxide pigment;
   adjusting the pH of the slurry to a level within a range of from about 1.0 to about 3.5;
   adding a first amount of an alumina coating agent to the slurry to form a first coating of amphorous alumina on the pigment and to increase the pH of the slurry to a level within a range of from about 8.0 to about 9.0;
   adding a second amount of the alumina coating agent to the slurry to form a second coating of boehmite alumina on the pigment and over the first coating; and
   maintaining the pH of the slurry at a level within a range of from about 8.0 to about 9.0 while adding the second amount of the alumina coating agent.

4. The process of claim 3, after adding the second amount of alumina coating agent, defined further to include the step of:
   digesting the slurry at a temperature within a range of from about 40° to about 100° C.

5. The process of claim 4, after digesting the slurry defined further to include the steps of:
   filtering the slurry to recover the coated antimony oxide pigment;
   washing the coated antimony oxide pigment;
   drying the coated antimony oxide pigment; and
   milling the coated antimony oxide pigment.

6. The process of claim 3 wherein the first amount of alumina coating agent is sufficient to provide the first coating within a range of from about 0.25 percent to about 1.5 percent by weight based on the weight of the pigment, and the second amount of alumina coating agent is sufficient to provide the second coating within a range of from about 0.25 percent to about 1.5 percent by weight based on the weight of the pigment.

7. The process of claim 3 wherein adjusting the pH of the slurry to a level within a range of from about 1.0 to about 3.5 is further defined as:
   adjusting the pH of the slurry to a level within a preferred range of from about 2.5 to about 3.0.

8. A process comprising:
   providing an aqueous slurry of antimony oxide pigment;
   adding acid to the slurry to adjust the pH of the slurry to a level within the range of from about 1.0 to about 3.5;
   adding a first amount of sodium aluminate solution to the slurry until the pH of the slurry is at a level within a range of from about 8.0 to about 9.0;
   adding a second amount of sodium aluminate solution to the slurry; and
   adding acid to the slurry while adding the second amount of sodium aluminate solution to maintain the pH of the slurry at a level within a range of from about 8.0 to about 9.0.

9. The process of claim 8 wherein the acid is concentrated sulfuric acid.

10. The process of claim 8 wherein the first amount of sodium aluminate is sufficient to effect a precipitation of alumina on the antimony oxide pigment at a level within a range of from about 0.25 percent to about 1.5 percent by weight based on the weight of the pigment.

11. The process of claim 10 wherein the second amount of sodium aluminate is sufficient to effect a precipitation of alumina on the antimony oxide pigment at a level within a range of from about 0.25 percent to about 1.5 percent by weight based on the weight of the pigment.

12. The process of claim 8, after adding the second amount of sodium aluminate solution to the slurry defined further to include the step of:
   digesting the slurry at a temperature within a range of from about 40° to about 100° C.

13. The process of claim 12, after digesting the slurry defined further to include the steps of:
   filtering the slurry to recover the coated antimony oxide pigment;
   washing the coated antimony oxide pigment;
   drying the coated antimony oxide pigment; and milling the coated antimony oxide pigment.

14. A coated antimony oxide pigment comprising:
an antimony oxide pigment;
a first coating of titania on the antimony oxide pigment; and
a second coating of alumina on the antimony oxide pigment and over the first coating.

15. A process comprising:
providing an aqueous slurry of antimony oxide pigment;
adjusting the pH of the slurry to a level within a range of from about 9.0 to about 10.0;
adding an amount of a titania coating agent to the slurry to form a first coating of titania on the pigment;
adjusting the pH of the slurry to a level within a range of from about 7.0 to about 9.0;
adding an amount of an alumina coating agent to the slurry to form a second coating of alumina on the pigment and over the first coating;
maintaining the pH of the slurry at a level within a range of from about 7.0 to about 12.0 while adding the alumina coating agent.

16. The process of claim 15, after adding the alumina coating agent, defined further to include the step of:
digesting the slurry at a temperature within a range of from about 40° to about 100° C.

17. The process of claim 16, after digesting the slurry, defined further to include the steps of:
filtering the slurry to recover the coated antimony oxide pigment;
washing the coated antimony oxide pigment;
drying the coated antimony oxide pigment; and
milling the coated antimony oxide pigment.

18. The process of claim 15 wherein the titania coating agent is added in an amount sufficient to provide a first coating within a range of from about 0.5 percent to about 1.5 percent by weight based on the weight of the pigment and the alumina coating agent is added in an amount sufficient to provide a second coating within a range of from about 0.5 percent to about 3.0 percent by weight based on the weight of the pigment.

19. The process of claim 18 wherein the titania coating agent is added, defined further as:
the titania coating agent is added in an amount sufficient to provide a first coating within a preferred range of from about 0.5 percent to about 1.0 percent by weight based on the weight of the pigment.

20. The process of claim 19 wherein the alumina coating agent is added, defined further as:
the alumina coating agent is added in an amount sufficient to provide a second coating within a preferred range of from about 1.0 percent to about 1.8 percent by weight based on the weight of the pigment.

21. A process comprising:
providing an aqueous slurry of antimony oxide;
adding base to the slurry to adjust the pH of the slurry to a level within a range of from about 9.0 to about 10.0;
adding an amount of titania solution to the slurry until the pH of the slurry is at a level less than about 3.0;
adding base to the slurry to adjust the pH of the slurry to a level within a range of from about 7.0 to about 9.0;
adding an amount of sodium aluminate solution to the slurry; and
maintaining the pH of the slurry at a level within a range of from about 7.0 to about 12.0 while adding the sodium aluminate solution to the slurry.

22. The process of claim 21 wherein the base is sodium hydroxide.

23. The process of claim 21, after adding the sodium aluminate solution to the slurry, defined further to include the step of:
digesting the slurry at a temperature within a range of from about 40° to about 100° C.

24. The process of claim 23, after digesting the slurry, defined further to include the steps of:
filtering the slurry to recover the coated antimony oxide pigment;
washing the coated antimony oxide pigment;
drying the coated antimony oxide pigment; and
milling the coated antimony oxide pigment.

25. The process of claim 21 wherein the titania solution is added, defined further as:
the titania solution is added in an amount sufficient to effect a precipitation of titania on the antimony oxide pigment at a level within a range of from about 0.5 percent to 1.5 percent by weight based on the weight of the pigment.

26. The process of claim 25 wherein the sodium aluminate is added, defined further as:
the sodium aluminate solution is added in an amount sufficient to effect a precipitation of alumina on the titania coated antimony oxide pigment within a range of from about 0.5 percent to about 3.0 percent by weight based on the weight of the pigment.

27. The process of claim 26 wherein the titania solution is added is further defined as:
the titania solution is added in an amount sufficient to effect a precipitation of titania on the antimony oxide pigment at a level within a preferred range of from about 0.5 percent to about 1.0 percent by weight based on the weight of the pigment.

28. The process of claim 27 wherein the sodium aluminate solution is added is further defined as:
the sodium aluminate solution is added in an amount sufficient to effect a precipitation of alumina on the titania coated antimony oxide within a preferred range of from about 1.0 percent to about 1.8 percent by weight based on the weight of the pigment.

* * * * *